United States Patent [19]

Baldoni, II et al.

[11] Patent Number: 5,250,477
[45] Date of Patent: Oct. 5, 1993

[54] SILICON NITRIDE BASED COMPOSITE WITH IMPROVED FRACTURE TOUGHNESS

[75] Inventors: Joseph G. Baldoni, II, Norfolk; Sergej-Tomislav Buljan, Acton, both of Mass.

[73] Assignee: GTE Valenite Corporation, Troy, Mich.

[21] Appl. No.: 596,112

[22] Filed: Oct. 11, 1990

Related U.S. Application Data

[62] Division of Ser. No. 892,642, Aug. 4, 1986, abandoned.

[51] Int. Cl.$^5$ ............................................. C04B 35/56
[52] U.S. Cl. .......................................... 501/95; 501/97; 501/98; 409/131; 407/119; 82/1.11
[58] Field of Search ...................... 501/92, 95, 96, 97, 501/98

[56] References Cited

U.S. PATENT DOCUMENTS

| | | | |
|---|---|---|---|
| 4,388,085 | 6/1983 | Sarin et al. | 51/307 |
| 4,406,667 | 9/1983 | Sarin et al. | 51/295 |
| 4,406,669 | 9/1983 | Sarin et al. | 51/295 |
| 4,406,670 | 9/1983 | Sarin et al. | 51/295 |
| 4,409,004 | 10/1983 | Sarin et al. | 51/295 |
| 4,416,670 | 10/1983 | Sarin et al. | 51/295 |
| 4,421,525 | 12/1983 | Sarin et al. | 51/295 |
| 4,421,528 | 12/1983 | Buljan et al. | 51/309 |
| 4,424,066 | 1/1984 | Sarin et al. | 51/295 |
| 4,425,141 | 1/1984 | Buljan et al. | 51/309 |
| 4,426,209 | 1/1984 | Sarin et al. | 51/295 |
| 4,433,979 | 2/1984 | Sarin et al. | 51/307 |
| 4,440,707 | 4/1984 | Shimamori et al. | 264/65 |
| 4,441,894 | 4/1984 | Sarin et al. | 51/295 |
| 4,449,989 | 5/1984 | Sarin et al. | 51/295 |
| 4,469,489 | 9/1984 | Sarin et al. | 51/295 |
| 4,507,224 | 3/1985 | Toibana et al. | 252/516 |
| 4,543,345 | 9/1985 | Wei | 501/95 |
| 4,610,917 | 9/1986 | Yamamura et al. | 428/224 |
| 4,818,635 | 4/1989 | Ekström et al. | 428/698 |
| 4,946,808 | 8/1990 | Wei et al. | 501/95 |
| 4,978,643 | 12/1990 | Venkataswamy et al. | 501/94 |
| 4,990,470 | 2/1991 | Yamamura et al. | 501/91 |
| 5,023,214 | 6/1991 | Matsumoto et al. | 501/97 |

FOREIGN PATENT DOCUMENTS 52-47803A 4/1977 Japan.
200863A 10/1985 Japan.

OTHER PUBLICATIONS

*Engineering Property Data on Typical Ceramics in Japan*, vol. 1, Toyota Ceramics Group (Japan), (1985).
S. T. Buljan et al., *Ceramic Engineering and Science Proceedings*, abstract of presentation, 10th Annual Conference on Composites & Advanced Ceramics, Cocoa Beach, Fla. Jan. 19–24, 1986.
S. T. Buljan et al., *J. Mat. Sci.*, Abstract of presentation, ACS Annual Mtg., Chicago, Ill.; Apr. 27–May 1, 1986.
S. T. Buljan et al., *Symposium E. Program*, abstract of presentation, Matls. Rsch. Soc. Meeting, Boston, Mass., Dec. 1–6, 1986.

*Primary Examiner*—Mark L. Bell
*Assistant Examiner*—A. Wright
*Attorney, Agent, or Firm*—Bill C. Panagos

[57] ABSTRACT

Composite materials, articles and cutting tools are prepared by densification to form a body comprising whiskers of hard refractory transition metal carbides, nitrides or carbonitrides uniformly distributed in a two-phase silicon nitride matrix. A first phase comprises silicon nitride grains and the second phase is an intergranular phase formed from one or more suitable densification aids. Optionally, dispersoid particles and/or polycrystalline fibers may also be incorporated. The preferred composite article or cutting tool has a fracture toughness equal to or greater than about 3.5 $MPa.m^{\frac{1}{2}}$.

2 Claims, No Drawings

SILICON NITRIDE BASED COMPOSITE WITH IMPROVED FRACTURE TOUGHNESS

This is a divisional of copending application Ser. No. 06/892,642 filed on Aug. 4, 1986, now abandoned.

CROSS REFERENCE TO RELATED APPLICATIONS

This application is related to U.S. patent application Ser. No. 06/892,634, now abandoned filed concurrently with the parent to this application, and entitled, "SILICON ALUMINUM OXYNITRIDE BASED COMPOSITE WITH IMPROVED FRACTURE TOUGHNESS"; and to U.S. patent application Ser. No. 07/158,491, filed Feb. 22, 1988, now U.S. Pat. No. 4,889,836 and entitled, "TITANIUM DIBORIDE-BASED COMPOSITE ARTICLES WITH IMPROVED FRACTURE TOUGHNESS.

FIELD OF THE INVENTION

This invention relates to fracture and abrasion resistant materials and to articles of manufacture made therefrom. More particularly, it is concerned with fracture and abrasion resistant materials comprising transition metal carbide, nitride or carbonitride whiskers distributed in a matrix containing silicon nitride, and with articles made therefrom.

BACKGROUND OF THE INVENTION

The need for materials for cutting tool applications, with improved toughness, good strength at elevated temperatures and chemical inertness, and capable of operating at high cutting speeds has generated a widespread interest in ceramic materials as candidates to fulfill these requirements. Conventional ceramic cutting too materials have failed to find wide application primarily due to their low fracture toughness.

Therefore, many materials have been evaluated to improve ceramic performance, such as silicon nitride based composite for cutting tool applications. Specific examples of silicon nitride based composite cutting tools are discussed in U.S. Pat. No. 4,388,085 to Sarin et al. (composite silicon nitride cutting tools containing particles of TiC); U.S. Pat. No. 4,425,141 to Buljan et al. (a composite modified silicon aluminum oxynitride cutting tool containing particulate refractory metal carbides, nitrides, and carbonitrides); U.S. Pat. No. 4,433,979 to Sarin et al. (composite silicon nitride cutting tools containing particulate hard refractory carbides or nitrides of Ti, V, Cr, Zr, Nb, Mo, Hf, Ta, and W); and U.S. Pat. No. 4,449,989 to Sarin et al. (composite silicon nitride cutting tools coated with two or more adherent layers of refractory materials).

Many improvements have been made in the toughness, abrasion resistance, high temperature strength and chemical inertness, but increased demands by the cutting tool industry require cutting tools with new and improved characteristics. In many applications, for example in gray cast iron and high nickel alloy machining, silicon nitride tool wear has been found to be dominated by abrasion. Even at cutting speeds as high as 5000 sfm, chemical reactions between tool and workpiece are negligible in comparison. It has been found that abrasion resistance for silicon nitride ceramic cutting tool materials is directly proportional to $K_{IC}^{\frac{3}{4}}H^{\frac{1}{2}}$, where $K_{IC}$ is the fracture toughness and H is the hardness. It may be seen, therefore, that further improvement in the fracture toughness of silicon nitride ceramic materials could bring about significant increases in both reliability and abrasive wear resistance, providing materials for cutting tools with new and improved characteristics. The present invention provides such new and improved ceramic materials.

The wear-resistant composite materials of the invention are also expected to find wide use in wear part and structural applications, for example in dies, turbines, nozzles, etc.

SUMMARY OF THE INVENTION

In accordance with one aspect of the present invention, there is provided a densified composite comprising about 5-60% by volume of whiskers of one or more transition metal carbides, nitrides, or carbonitrides, of titanium, hafnium, tantalum, niobium, or tungsten, or mixtures or solid solutions thereof substantially evenly distributed in a two phase matrix. The matrix comprises a first phase of silicon nitride and a continuous, intergranular phase formed from a densification aid. The whiskers are present in the densified composite in an amount of about 5-60% by volume. Optionally, particles and/or polycrystalline fibers of one or more carbides, nitrides, or carbonitrides, of titanium, zirconium, hafnium, vanadium, niobium, tantalum, chromium, molybdenum, or tungsten, or silicon carbide, titanium diboride, or hafnium diboride, or mixtures or solid solutions thereof may be admixed with the whiskers in an amount up to about 95% by volume of the total dispersoid mixture, but the total amount of the dispersoids should not exceed about 70% by volume. The densification aid preferably comprises about 1-25% by weight of the matrix, the balance being silicon nitride. The composite possesses properties of a density greater than 98% of theoretical, high abrasion resistance, high hardness, a fracture toughness greater than or equal to 3.5 MPa.m$^{\frac{1}{2}}$, and resistance to oxidation at temperatures greater than 1200° C.

In accordance with other aspects of the present invention, there are provided composite articles of manufacture and cutting tools, coated composite articles and cutting-tools, and a process for making the composite material of the present invention.

DETAILED DESCRIPTION OF THE PREFERRED EMBODIMENTS

For a better understanding of the present invention, together with other and further objects, advantages and capabilities thereof, reference is made to the following disclosure and appended claims.

Fracture and abrasion resistant materials according to the present invention comprise whiskers of a hard refractory transition metal carbide, nitride, or carbonitride, or mixtures or solid solutions thereof dispersed in a two-phase matrix. By the term transition metal carbide, nitride, or carbonitride, as used throughout this specification and appended claims, is meant any carbide, nitride, or carbonitride of titanium, hafnium, tantalum, niobium, or tungsten The hard refractory whiskers incorporated into materials in accordance with this invention each comprise a single crystal, and preferably have an average diameter of about 1-5 microns and an average length of about 10-250 microns, with a preferred aspect ratio of length to diameter of at least 5 to 1.

The useful life and performance of articles in accordance with this invention depends, in large part, on the volume taken up by the dispersed phase in the article. The whiskers should comprise about 5-60% by volume of the densified composite. The preferred range of refractory whisker content is about 5-40% by volume. A more preferred range is about 10-30% by volume.

Optionally, in addition to the whisker dispersoid the composite may include other dispersed components. For example, particles and/or polycrystalline fibers may be included in an amount of about 95% by volume of the total dispersoid mixture. The, fibers and/or particles are of a hard carbide, nitride or carbonitride of titanium, zirconium, hafnium, vanadium, niobium, tantalum, chromium, molybdenum, or tungsten; or alumina, silicon nitride, silicon carbide, titanium diboride or hafnium diboride; or mixtures or solid solutions of these materials. The particle and/or fiber material may be the same or different from each other and from the whisker material. The total amount of the dispersoids including whiskers, fibers and particles, however, should not exceed about 70% and preferably is in the range of 5-40% by volume.

In accordance with the principles of the present invention, the hard refractory dispersoids are uniformly distributed in a two-phase matrix. The first phase of the matrix consists essentially of silicon nitride. The intergranular phase or secondary phase of the matrix is formed from one or more densification aids.

For optimizing the desirable properties, particularly high temperature strength of the composite of the present invention, it is preferable to maximize the high temperature stability of the secondary, intergranular phase and to maximize the density of the final densified composites. While the densification aid is essential to achieve highest densities, that is, densities greater than 98% of theoretical, improper composition of the second phase can deleteriously affect maximum attainable high temperature strength and creep resistance. The densification aids of the present invention stabilize the secondary phase to such an extent that the secondary phase is a refractory phase having desirable high temperature properties. Preferred densification aids are yttrium oxide, cerium oxide, zirconium oxide, hafnium oxide, silica, magnesia and mixtures thereof. The one or more densification aids are employed from a lower effective amount which permits high theoretical densities to an upper amount which does not unduly effect the high temperature properties. Preferably, the densification aids comprise about 1-25% by weight of the matrix; more preferably, about 1-5% by weight of the matrix.

For optimizing the desirable high temperature properties of the composite of the present invention, alumina is present as a densification aid in the secondary phase of the matrix material in a minimal amount, i.e. less than about 5% by weight based on the total weight of the matrix material, and preferably less than about 3% by weight.

The intergranular phase may contain additives and impurities in addition to the hereinbefore mentioned densification aids and additives. Such further additional materials may contribute to the desirable final properties of the composite, and are preferably present in an amount less than about 5% by weight based on the weight of the secondary phase Impurities may be present in the starting materials used for the manufacture of the composite of the present invention. These impurities tend to become concentrated in the intergranular phase during preparation of the composite. Therefore, high purity starting materials are desired, preferably those having less than about 0.1 weight percent cation impurities. A typical undesirable impurity is calcium, which tends to deleteriously affect the secondary intergranular phase and high temperature properties.

The materials described herein have a composite microstructure of refractory whiskers, optionally with refractory fibers and/or particulate refractory grains, uniformly dispersed in a matrix containing a phase of $Si_3N_4$ grains, and a continuous intergranular phase formed from the densifying additive. Because the intergranular phase is continuous, its characteristics profoundly affect the high temperature properties of the composite material. The composite materials of the present invention possess high strength at temperatures in excess of 1200° C., preferably in excess of 1500° C.

Articles formed from the densified composite material according to the present invention may be coated with one or more adherent layers of hard refractory materials, for example by known chemical vapor deposition or physical vapor deposition techniques. Typical chemical vapor deposition techniques are described in U.S. Pat. Nos. 4,406,667, 4,409,004, 4,416,670, and 4,421,525, all to Sarin et al., and all incorporated herein by reference. The hard refractory materials suitable for coating articles according to the present invention include the carbides, nitrides, and carbonitrides of titanium, zirconium, hafnium, vanadium, niobium, tantalum, chromium, molybdenum, and tungsten, and mixtures and solid solutions thereof, and alumina, zirconia, and hafnia, and mixtures and solid solutions thereof. Each layer may be the same or different from adjacent or other layers. Such coatings are especially advantageous when applied to cutting tools formed from the densified composites of the present invention.

In accordance with the invention, a method is provided for preparing the composites described above, sintering the materials to densities approaching theoretical density, i.e. greater than 98% of theoretical, while achieving optimum levels of mechanical strength and toughness at both room temperature and elevated temperature, making the composite particularly useful as cutting tools in metal removing applications.

The hard refractory whiskers, with or without other dispersoids, are dispersed in the two phase matrix which is compacted to a high density by sintering or hot pressing techniques. A composition for the production of abrasion resistant materials according to the present invention may be made by employing $Si_3N_4$ powder, preferably, of average particle size below about 3 microns.

Densification of the silicon nitride-whisker composite is aided by the incorporation of one or more of the densification aids listed above into the initial composition. In the initial compositions employed in the fabrication, the hard refractory whiskers comprise about 5-60% of the total volume of the densified article, as set out above. Optionally, as described above, other dispersoids may be admixed with the whiskers, up to about 95% by volume of the dispersoid mixture. The total volume of the dispersoids in the densified composite should be limited to about 70% by volume. In the densified composite, the balance of the composite material comprises the matrix of silicon nitride grains and the intergranular phase formed from the densification aid. In this densified composite, the densification aid makes up about 1-25% by weight of the host matrix. The starting materials may be processed to a powder compact of adequate green strength by thoroughly mixing the matrix starting materials by processes such as dry milling or ball milling in a nonreactive liquid medium, such as toluene or methanol; admixing the whiskers and any other dispersoids by blending, preferably in a nonreactive liquid medium; and forming the mixture, for example by pressing, injection molding, extruding, or slip casting Processing may also optionally include a presintering or prereacting step in which either the uncompacted materials or the compact is heated at moderate temperatures.

Since the strength of articles in accordance with this invention decreases with increasing porosity in the total compact, it is important that the compact be sintered or hot pressed to a density as nearly approaching 100% of theoretical density as possible, preferably greater than 98% of theoretical density. The measure of percent of theoretical density is obtained by a weighted average of the densities of the components of the compact.

To enable one skilled in the art to practice this invention, the following Example is provided.

EXAMPLE

Silicon nitride composite bodies were made from a starting powder formulated from 6% by weight yttria powder, 2% by weight alumina powder and the remainder silicon nitride powder, the mixture being dry milled 24 hours at 140 rpm to blend the components. The starting powder was mixed with titanium carbide (TiC) whiskers of average diameter about 5μm, average length about 250 μm. Three batches were prepared: Batch 1 containing 10% by volume TiC whiskers; Batch 2, 20% by volume; Batch 3, 30% by volume. In each case, the whiskers were wet blended in methanol with the starting powder.

The whisker-powder mixtures from each batch were hot pressed at a temperature of 1725° C.±5° C., and at a pressure of 5000 psi for lengths of time sufficient to obtain composite bodies. A batch of comparative samples was also prepared in a similar manner from the same starting powder formulation, but without the whisker component. The density as percent of theoretical (% T.D.), the Knoop hardness(HKN), and fracture toughness ($K_{IC}$) of the composite bodies of each batch are shown in Table 1.

TABLE 1

| Batch | TiC Whisker Content, v/o | Density, % T.D. | HKN, GPa | $K_{IC}$ MPa·m$^{\frac{1}{2}}$ |
|---|---|---|---|---|
| Comparative | 0 | 98.8 | 13.8 | 3.6 |
| 1 | 10 | 100.6 | 13.8 | 4.1 |
| 2 | 20 | 100.9 | 13.9 | 4.4 |
| 3 | 30 | 102.2 | 13.1 | 7.1 |

Relative fracture toughness values were obtained by an indentation fracture test utilizing a Vickers diamond pyramid indenter. In this test the length of cracks developed at the corners of the indentation and the indentation size are used to obtain fracture toughness ($K_{IC}$) values by a relationship:

$$K_{IC} = 0.113\, HD^{\frac{1}{2}} / \left(1 + \frac{2D}{C_L}\right)^{3/2}$$

where
$K_{IC}$ = fracture toughness (MPa·m$^{\frac{1}{2}}$)
H = hardness (GN/m$^2$)
D = indentation diagonal (μm)
$C_L$ = sum of cracks (μm)

The densities shown in Table 1 for the silicon nitride-whisker composites tested are greater than 100 percent of theoretical. This is a result of chemical interactions of the constituents and modification of the intergranular phase which are not accounted for in the calculation of theoretical density.

The above Example is not to be viewed as limiting the scope of the invention as claimed, but is intended only to be illustrative thereof The materials of the invention can be prepared by hot pressing techniques, e.g. as described above, or by hot isostatic pressing and sintering techniques, e.g. a technique in which pressed green compacts containing silicon nitride, single crystal whiskers, and a sintering or densification aid are sintered to a dense, polycrystalline product. Optionally, the pressed green compact to be sintered may be formulated with, in an admixture with the whiskers, particles and/or polycrystalline fibers as described above. The materials may be combined before hot pressing or sintering by the method described in the Example, or by other methods known in the art.

Densified ceramic articles made in accordance with this invention are hard, tough, nonporous, abrasion resistant, and resistant to oxidation. Applications of these articles include, but are not limited to, cutting tools, mining tools, stamping and deep-drawing tools, extrusion dies, wire and tube drawing dies, nozzles, guides, bearings, and wear-resistant and structural parts, and will be especially useful as shaped cutting tools for continuous or interrupted milling, turning or boring of cast iron stock or high nickel (at least 50% Ni) alloy stock, e.g. Inconel.

What is claimed is:

1. A method for continuous or interrupted machine cutting of cast iron stock comprising the step of milling, turning, or boring with a shaped tool of a densified abrasion and fracture resistant composite material comprising:

about 5-60% by volume of one or more first dispersoid materials selected from the group consisting of whiskers of carbides, nitrides, and carbonitrides of titanium, hafnium, tantalum, niobium, and tungsten, and solid solutions thereof; and optionally, one or more other dispersoid materials selected from the group consisting of particles and polycrystalline fibers of carbides, nitrides, and carbonitrides of titanium, zirconium, hafnium, vanadium, niobium, tantalum, chromium, molybdenum, and tungsten, and silicon carbide, titanium diboride, hafnium diboride, and alumina, and mixtures and solid solutions thereof; wherein the combined dispersoid materials comprise about 5-70% by volume of the densified composite material;

the remainder of the densified composite material being a two-phase matrix comprising a first phase of silicon nitride grains and a second, continuous intergranular phase formed from one or more suitable densification aids;

wherein the dispersoid materials are substantially uniformly distributed in the two-phase matrix, and the densified composite material has a density greater than about 98% or theoretical and a fracture toughness greater than or equal to 3.5 MPa.m$^{\frac{1}{2}}$.

2. A method for continuous or interrupted machine cutting of high nickel alloy stock comprising at least 50% nickel comprising the step of milling, turning, or boring with a shaped tool of a densified abrasion and fracture resistant composite material comprising:

about 5–60% by volume of one or more first dispersoid materials selected from the group consisting of whiskers of carbides, nitrides, and carbonitrides of titanium, hafnium, tantalum, niobium, and tungsten, and solid solutions, thereof; and optionally, one or more other dispersoid materials selected from the group consisting of particles and polycrystalline fibers of carbides, nitrides, and carbonitrides of titanium, zirconium, hafnium, vanadium, niobium, tantalum, chromium, molybdenum, and tungsten, and silicon carbide, titanium diboride, hafnium diboride, and alumina, and mixtures and solid solutions thereof; wherein the combined dispersoid materials comprise about 5–70% by volume of the densified composite material;

the remainder of the densified composite material being a two-phase matrix comprising a first phase of silicon nitride grains and a second, continuous intergranular phase formed from one or more suitable densification aids;

wherein the dispersoid materials are substantially uniformly distributed in the two-phase matrix, and the densified composite material has a density greater than about 98% or theoretical and a fracture toughness greater than or equal to 3.5 MPa.m$^{\frac{1}{2}}$.

* * * * *